US012113178B2

(12) United States Patent
Miller et al.

(10) Patent No.: US 12,113,178 B2
(45) Date of Patent: Oct. 8, 2024

(54) SEPARATORS, BATTERIES, BATTERY STRINGS WITH IMPROVED PERFORMANCE, AND RELATED METHODS

(71) Applicant: Daramic, LLC, Charlotte, NC (US)

(72) Inventors: Eric H. Miller, Philpot, KY (US); Yanxia Wu, Shanghai (CN)

(73) Assignee: Daramic, LLC, Charlotte, NC (US)

(*) Notice: Subject to any disclaimer, the term of this patent is extended or adjusted under 35 U.S.C. 154(b) by 196 days.

(21) Appl. No.: 15/232,898

(22) Filed: Aug. 10, 2016

(65) Prior Publication Data
US 2017/0054123 A1    Feb. 23, 2017

Related U.S. Application Data

(60) Provisional application No. 62/203,050, filed on Aug. 10, 2015.

(51) Int. Cl.
H01M 10/12     (2006.01)
H01M 50/417    (2021.01)
H01M 50/437    (2021.01)
H01M 50/44     (2021.01)
H01M 50/454    (2021.01)
(Continued)

(52) U.S. Cl.
CPC ....... *H01M 10/121* (2013.01); *H01M 50/417* (2021.01); *H01M 50/437* (2021.01); *H01M 50/44* (2021.01); *H01M 50/454* (2021.01); *H01M 50/463* (2021.01); *H01M 10/14* (2013.01); *H01M 2220/10* (2013.01);
(Continued)

(58) Field of Classification Search
None
See application file for complete search history.

(56) References Cited

U.S. PATENT DOCUMENTS 4,861,644 A * 8/1989 Young ............... B41M 1/30
                                                  427/256
6,509,118 B1   1/2003 Pavlov et al.
(Continued)

FOREIGN PATENT DOCUMENTS

JP      63252354 A   † 10/1988
WO   2011133677 A1     10/2011

OTHER PUBLICATIONS

Concorde Battery Corporation, Technical Manual For Sun Xtender® Batteries, pp. 1-41, Jul. 18, 2011 (copy provided in file) (Year: 2011).*

(Continued)

*Primary Examiner* — Amanda J Barrow
(74) *Attorney, Agent, or Firm* — Hammer & Associates, P.C.

(57) ABSTRACT

Improved battery separators are disclosed herein for use in various lead acid batteries, and in particular lead acid battery strings. The improved separators, batteries, battery strings, methods, and vehicles disclosed herein provide substantially increased battery life, substantially reduced battery fail rate, and substantially higher voltage uniformity among the various batteries in a battery string. The improved battery strings may be advantageously employed in high depth of discharge applications such as electric bicycles, golf carts (or golf cars), uninterrupted power supply (UPS) backup power battery strings, and the like.

4 Claims, 8 Drawing Sheets

(51) Int. Cl.
*H01M 50/463* (2021.01)
*H01M 10/14* (2006.01)
(52) U.S. Cl.
CPC .......... *H01M 2220/20* (2013.01); *Y02E 60/10* (2013.01); *Y02P 70/50* (2015.11); *Y02T 10/70* (2013.01)

(56) References Cited

U.S. PATENT DOCUMENTS

| | | | | |
|---|---|---|---|---|
| 6,703,161 | B2 | 3/2004 | Zucker | |
| 7,662,517 | B2 † | 2/2010 | Lee | |
| 2003/0031920 | A1 | 2/2003 | Hoffman et al. | |
| 2003/0054234 | A1 | 3/2003 | Zucker | |
| 2003/0054236 | A1* | 3/2003 | Zucker | H01M 2/1606 429/145 |
| 2003/0054237 | A1* | 3/2003 | Zucker | H01M 2/1666 429/145 |
| 2003/0193110 | A1* | 10/2003 | Yaritz | H01M 50/417 264/211 |
| 2005/0158630 | A1* | 7/2005 | Lambert | H01M 50/446 429/251 |
| 2006/0121269 | A1* | 6/2006 | Miller | B29C 55/18 428/315.7 |
| 2006/0141350 | A1 | 6/2006 | Dreyer et al. | |
| 2009/0305127 | A1* | 12/2009 | Miller | H01M 50/446 429/163 |
| 2010/0136425 | A1* | 6/2010 | Gau | B60L 11/007 429/187 |
| 2012/0070747 | A1* | 3/2012 | Whear | H01M 10/06 429/247 |
| 2012/0094183 | A1* | 4/2012 | Deiters | H01M 10/06 429/246 |
| 2014/0038023 | A1 | 2/2014 | Guo et al. | |
| 2014/0113506 | A1* | 4/2014 | Jones | G01R 31/3637 439/761 |
| 2014/0315065 | A1 | 10/2014 | Mizuno et al. | |

OTHER PUBLICATIONS

ProWriting Aid, The Grammar Guide, Comma Section, accessed Jan. 12, 2021, URLs: prowritingaid.com/comma and https://prowritingaid.com/grammar/1000023/How-do-I-add-commas-to-a-number-for-clarity#:~: text=In%20large%20numbers%2C%20commas%20are,comma%20after%20every%20third%20digit (Year: 2021).*

"Puncture Testing Essentials," ADMET Materials Testing System Manufacture, accessed at https://www.admet.com/puncture-testing-essentials/ accessed Jul. 10, 2022, actual date of publication unknown (Year: 2022).*

Tensile Testing, Chapter 1, (c) 2004 ASM International, Tensile Testing, Second Edition, www.asminternaional.org (copy provided), (Year: 2004).*

International Search Report and Written Opinion issued in Application No. PCT/US2016/046237 dated Nov. 11, 2016.

EP Divisional Extended Search Report receved Jun. 21, 2023; from EP Divisional counterpart Application No. 23161862.0.

Concorde Battery Corporation, Technical Manual for Sun Xtender® Batteries, pp. 1-41, Jul. 18, 2011, West Covina, CA, retrieved from http://web.archive.org/web/20120328181624/http://www.sunxtender.com/pdfs/Sun_Xtender_Battery_Technical_Manual.pdf.†

* cited by examiner
† cited by third party

| Characteristic | Unit | PE layer |
|---|---|---|
| Thickness (Backweb) | microns | 175 |
| Puncture | (N) | 8.9 |
| Tensile - CMD | (N/mm2) | 8 |
| Elongation - MD | (%) | 245 |
| Elongation - CMD | (%) | 460 |
| Porosity | (%) | 60 |
| Total Oil | (%) | 5.3 |
| ER (20min soak) | (mohm-cm2) | 55 |
| Acid Displacement | (cm3/cm2) | 78 |
| Basis Weight | (gsm) | 110 |

FIGURE 4

SEPARATORS, BATTERIES, BATTERY STRINGS WITH IMPROVED PERFORMANCE, AND RELATED METHODS

CROSS-REFERENCE TO RELATED APPLICATION

This application claims priority to and benefit of U.S. Provisional Patent Application No. 62/203,050, filed on Aug. 10, 2015, and the entire content of the aforementioned application is herein fully incorporated by reference.

FIELD

In accordance with at least selected embodiments, the present disclosure or invention is directed to improved separators, batteries, battery strings, and/or methods of manufacture and/or use. In accordance with at least certain embodiments, the present disclosure or invention is directed to improved strings of VRLA batteries (including AGM batteries and/or gel batteries) and/or improved methods of using a string of VRLA batteries. In addition, disclosed herein is a method, system, battery, battery string, and battery separator for enhancing battery life and improving uniformity in a battery string, especially a VRLA AGM lead acid battery string.

BACKGROUND

Valve-regulated lead acid (VRLA) batteries, which are typically vented batteries with electrolyte suspended between the electrodes, are known in the art. Some VRLA batteries are known as VRLA AGM batteries, meaning that the separator used in such batteries may include one or more layers of an AGM (absorptive glassmat or absorbed glass mat, which contains glass fibers). However, the glass fibers in AGM separators may break over time during cycling and/or under high compression. Additionally, conventional AGM separators do not provide puncture resistance to the battery separator or system. The degradation of the glass fibers may change the level of compression in the battery system over time and may influence acid migration within the battery and within the AGM separator, possibly resulting in poor acid availability to the electrodes and/or potentially leading to acid stratification. Acid stratification, when acid stratifies instead of being uniformly mixed, in a VRLA battery may lead to underutilization of a portion of one or more of the electrodes potentially resulting in sulfation, poor battery performance, and/or reduced or shorter cycle life. Additionally, while acid-filling a VRLA battery using a traditional AGM separator, an electrode may become more reactive, consuming acid and/or converting it to water or steam, which can create lead sulfate and can lead to hydration shorts, dendrite growth, battery life reduction, dry spots, and/or thermal runaway. The last regions of the AGM separator to be wetted by the electrolyte may be the most prone to risk of hydration shorts.

Additionally, precision of the manufacturing of the electrodes and the separator(s) within a battery system may be important to ensuring uniformity within a VRLA AGM battery string. As a battery string cycles, imperfections in the plate(s) or separator(s) may impact cell uniformity and thereby impact the entire battery string.

Typically, for lead acid batteries, each cell may be a 2-volt cell. A monoblock VRLA battery and/or a monoblock VRLA AGM battery may include more than one 2-volt cell. For example, a 12-volt monoblock VRLA battery or VRLA AGM battery may include six 2-volt cells. Typically 6-volt, 8-volt, or 12-volt VRLA and/or VRLA AGM monoblock batteries are used in "strings" to increase the voltages to, for example, 36 volts or 48 volts. Batteries, including VRLA batteries, may be joined together to form a string of batteries, in which the voltage total of the string is equal to the sum of the voltages of the individual batteries. For instance, a string of three 12-volt monoblock batteries nominally produces a total of 36 volts. A string of monoblock batteries may have many electrodes, plates, separators, etc. in the entire string, thereby potentially increasing the risk of failure because of the need for manufacturing precision and the need for uniformity among all of those different, individually-manufactured cells.

Variations within the many cells within a string of batteries may create a non-uniform voltage. By way of example, uniform container filling and uniform formation may be important, and under high compression, with thin grids, and fragile AGM separators, systems may be at risk for shorting. Additionally, by way of example, over time, as positive electrodes age, they may shed positive active material (PAM), which may create a lack of uniformity in that battery and ultimately in the battery string, because of possible lower voltages from that battery and potential micro shorts through that battery separator. The lack of PAM adhesion to the positive electrode grid combined with any shorts that may be taking place may add to the lack of voltage uniformity within the battery string. A lack of uniformity can impact the recombination rate of the battery (e.g., increase the amount of recombination taking place to an undesirable level) resulting in dry spots and potentially leading to thermal runaway.

Additionally, if a single battery within a string of batteries fails, the deep cycling of the entire system may be compromised, and the battery's performance or battery string's performance may be diminished and its life may be shortened. As such, the battery string may be only as good as the weakest link in the string. Improving the overall uniformity over the life of the entire battery string will result in longer string life and ultimately may produce batteries that, because of their longer lives, are greater or higher in value and possibly carry longer warranties than known batteries today, even resulting in fewer warranty claims on such batteries, bringing much benefit to battery manufacturers. Such may increase the value of the battery string or pack overall.

In some instances, such as in U.S. Pat. No. 6,703,161 owned by Daramic, LLC of Charlotte, NC, and incorporated by reference herein, there have been disclosed battery separators for lead acid storage batteries that are, for instance, multi-layer battery separators, and such separators may be used with VRLA batteries. The separators disclosed therein include a microporous polymer layer sandwiched between at least two fibrous layers.

There is a need to further develop even more improved battery separators for all types of VRLA batteries (including AGM, gel, and those batteries that combine aspects of AGM and gel). There is a need for improved battery strings with improved uniformity and performance in comparison to what has been previously available.

SUMMARY

In accordance with at least selected embodiments, the present disclosure or invention may address the above mentioned and other needs. For example, in accordance with at least certain embodiments, the present disclosure or invention is directed to improved battery separators, improved batteries, improved VRLA and/or VRLA AGM battery strings, improved methods, and uses related thereto.

Disclosed herein are improved battery strings made from individual batteries having specific kinds of separators. It has been surprisingly found that by appropriate selection of separator characteristics, battery string performance can be improved with longer cycle life, thereby resulting in batteries that carry more value and may carry higher warranties because of improved cycle life.

BRIEF DESCRIPTION OF THE DRAWINGS

As shown in FIG. 1, VRLA AGM battery strings made according to embodiments described herein surprisingly exhibit increased capacity or less capacity decline, longer cycle life, and higher voltage uniformity over multiple charge/discharge cycles relative to conventional VRLA AGM battery strings.

As shown in FIG. 2, VLRA AGM battery strings made according to embodiments described herein surprisingly exhibit more stable capacity in the whole cycle life and longer cycle life over multiple charge/discharge cycles relative to conventional VRLA AGM battery strings.

As shown in FIG. 3, VLRA AGM battery strings made according to embodiments described herein surprisingly exhibit higher voltage uniformity over multiple charge/discharge cycles relative to conventional VRLA AGM battery strings.

FIG. 4 includes a chart of various physical properties of a microporous polyolefin layer used in battery separators used in various VRLA AGM battery strings according to the embodiments described herein and depicted in FIGS. 1-3.

As shown in FIG. 5, VLRA AGM battery strings made according to embodiments described herein surprisingly exhibit more stable capacity in the whole cycle life and longer cycle life over multiple charge/discharge cycles relative to conventional VRLA AGM battery strings.

As shown in FIG. 6, VLRA AGM battery strings made according to embodiments described herein surprisingly exhibit higher voltage uniformity over multiple charge/discharge cycles relative to conventional VRLA AGM battery strings.

As shown in FIG. 7, VLRA AGM battery strings made according to embodiments described herein surprisingly exhibit more stable capacity in the whole cycle life and longer cycle life over multiple charge/discharge cycles relative to conventional VRLA AGM battery strings.

As shown in FIG. 8, VLRA AGM battery strings made according to embodiments described herein surprisingly exhibit higher voltage uniformity over multiple charge/discharge cycles relative to conventional VRLA AGM battery strings.

DETAILED DESCRIPTION

Figure 1:
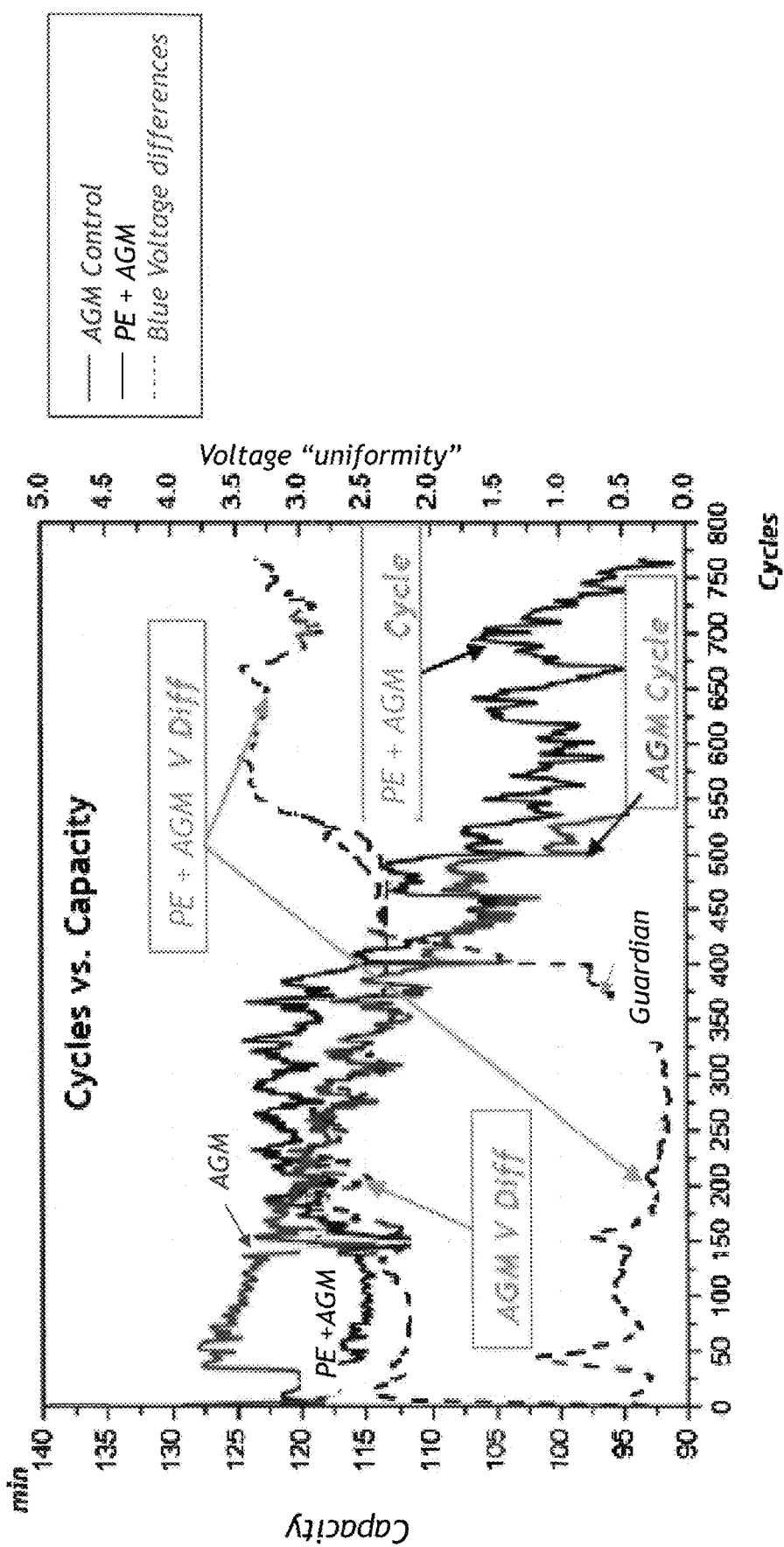
FIG. 1 includes a comparison of an improved VRLA AGM battery string made according to embodiments described herein with a conventional battery string.

In various embodiments described herein, a separator is employed that preferably comprises a microporous polyolefin separator layer and one or more AGM layers. When one AGM layer is used, the AGM layer is arranged such that it is against the positive electrode in the monoblock VRLA battery (so as to provide more acid to the system). When two AGM layers are used, the microporous polyolefin separator layer may be sandwiched between two AGM layers. When more than two AGM layers are used, various constructions of AGM layer(s) and microporous polyolefin separator layer(s) can be used. In various embodiments, a side seal is provided to such sandwiches of layer(s) of AGM and layer(s) that are microporous polyolefin separator layer(s). In other embodiments, no side seal is provided to such a sandwich of layers. In some embodiments, two layers of AGM and one layer of microporous polyolefin separator are unwound and stacked or sandwiched together to form a separator for improving performance and life for a VRLA AGM battery string.

In certain embodiments, the microporous polyolefin separator layer can be a flat sheet of polyolefin. In other embodiments, the microporous polyolefin separator layer can be a flat sheet of polyolefin combined with performance enhancing additives. In certain embodiments, the microporous polyolefin separator layer can be a ribbed or embossed sheet of polyolefin. In other embodiments, the microporous polyolefin separator layer can be a ribbed or embossed sheet of polyolefin combined with certain additives.

According to certain preferred embodiments the separator of the invention comprises one microporous polymer layer (typically a microporous polyolefin separator layer), one first AGM layer and, in certain embodiments, one second AGM layer. The separator may be arranged in such a way that a microporous polyolefin separator layer is sandwiched between two AGM layers, and those two AGM layers have about the same thickness, for example, a thickness of between about 0.1 mm and about 3.3 mm. In other embodiments, the two AGM layers may have different thicknesses with the thickness of the AGM layer touching or against or wrapping the positive plate or electrode being thicker than the thickness of the AGM layer touching or against or wrapping the negative plate. The AGM layer(s) serve as an acid reservoir, and a thicker AGM layer in conjunction with the positive plate provides more acid towards that positive plate. In such embodiments, within the battery the separator is arranged in such a way that a first AGM layer having a certain minimum thickness faces the negative electrode. This minimum thickness can be 0.6 mm, 0.8 mm or 1.0 mm (determined at 10 Kpa according to the BCI Test Method; this method is described in "BCI/RBSM Standard Test Methods, Battery Council International, Chicago, Ill., USA; if not stated otherwise the thickness of the fibrous layer always refers to the thickness of the dry layer). The maximum thickness can be 2.7 mm, 2.0 mm, or 1.5 mm.

The second AGM layer in such embodiments is toward the positive plate, is thicker, and has preferably a thickness of 0.1 to 3.3 mm, preferably within the range of 0.5 to 3.3 mm, more preferably within the range of 0.75 to 3.1 or 3.3 mm, and most preferably within the range of 1.0 to 2.8 or 3.3 mm.

Generally all glass fiber materials known in the art for producing absorptive glassmat (AGM) separators may be used for forming the AGM layer(s) of the present invention. Certain preferred fibrous materials include absorptive microfiber glass fleeces without organic components like binder or polymeric fibers (however, in certain embodiments, AGM layer(s) with such organic components, binders, and/or polymeric fibers may also be used). Some AGM layers useful in accordance with the present disclosure include a combination of glass fibers and fibers made from one or more polymers. By way of example, some AGM layers include polyester fibers and/or hydrophilic fibers. In certain embodiments, the use of such polymeric fibers in an AGM layer leads to increased strength and/or increased ability to automate the process of making a separator or an AGM layer. However, in various preferred embodiments herein, the overall separator construction may be strong enough (with a balance of coarse glass fibers for strength and fine glass fibers for capillary action) for an AGM layer to include only glass fibers. In some instances, it is preferred that the fibers have a diameter ranging from 0.1 to 10 μm, more preferably from 0.1 to 5 μm. The fibers are preferably blends of acid resistant glass fibers of various diameter, usually extremely thin or fine fibers with an average fiber diameter below 1 μm, referred to as microfibers, and "coarse" fibers with an average diameter of greater than 1 μm, for example, approximately 3 μm. The microfibers may increase the internal surface area and may decrease the pore diameter, but may significantly increase the product cost. Generally speaking, the addition of the microporous polyolefin separator layer, as discussed herein, to one or more AGM layers adds superior strength and improved physical properties to the overall battery separator construction.

The microporous polymer separator layer is preferably made of a polyolefin, such as polypropylene, ethylene-butene copolymer, and preferably polyethylene, more preferably high molecular weight polyethylene, i.e., polyethylene having a molecular weight of at least 600,000, or high density polyethylene, e.g., polyethylene having a molecular weight of at least 500,000. In some embodiments, one or more ultrahigh molecular weight polyethylenes are used, i.e., polyethylene having a molecular weight of at least 1,000,000, in particular more than 4,000,000, and in some instances 5,000,000 to 8,000,000 (measured by viscosimetry and calculated by Margolie's equation), a standard load melt index of substantially 0 (measured as specified in ASTM D 1238 (Condition E) using a standard load of 2,160 g) and/or a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the separator is made up of an ultrahigh molecular weight polyethylene (UHMWPE) mixed with a processing oil and silica, for example, precipitated silica and/or fumed silica. In accordance with at least one other embodiment, the separator is made up of an ultrahigh molecular weight polyethylene (UHMWPE) mixed with a processing oil, additive, and silica, for example, precipitated silica and/or fumed silica. The microporous polymer separator layer preferably comprises a homogeneous mixture of 8 to 100 vol. % of polyolefin, 0 to 40 vol. % of a plasticizer (or processing oil) and 0 to 92 vol. % of inert filler material (such as silica). In some instances, the preferred filler is dry, finely divided silica. However, the filler may be selected from the group consisting of: silica, mica, montmorillonite, kaolinite, asbestos, talc, diatomaceous earth, vermiculite, natural and synthetic zeolites, cement, calcium silicate, clay, aluminum silicate, sodium aluminum silicate, aluminum polysilicate, alumina silica gels, glass particles, carbon black, activated carbon, carbon fibers, charcoal, graphite, titanium oxide, iron oxide, copper oxide, zinc oxide, lead oxide, tungsten, antimony oxide, zirconia, magnesia, alumina, molybdenum disulfide, zinc sulfide, barium sulfate, strontium sulfate, calcium carbonate, magnesium carbonate, and the like, and various combinations thereof.

The preferred plasticizer or processing oil is petroleum oil and/or a wax. Since the plasticizer is the component which is easiest to remove from the polymer-filler-plasticizer composition, it is useful in imparting porosity to the microporous polyolefin battery separator layer. The porosity of the microporous polymer separator layer may be in a range of about 35% to about 90%, more preferably, about 55% to about 80%, and such range ensures that the separator layer has low ER (electrical resistance) while at the same time preventing shorting.

The microporous polymer separator layer has an average pore size of less than 1 μm in diameter. Preferably more than 50% of the pores are 0.5 μm or less in diameter. It is especially preferred that at least 90% of the pores have a diameter of less than 0.9 μm. The microporous polymer separator layer preferably has an average pore size within the range of 0.05 to 0.9 μm, in some instances, 0.1 to 0.3 μm.

Unless otherwise stated, the pore size of the AGM layer(s) and the microporous polymer separator layer(s) is measured using the mercury intrusion method described in Ritter, H. L., and Drake, L. C., Ind. Eng. Chem. Anal. Ed., 17, 787 (1945). According to this method, mercury is forced into different sized pores by varying the pressure exerted on the mercury by means of a porosimeter (porosimeter model 2000, Carlo Erba). The pore distribution is determined by evaluation of the crude data with the MILESTONE 200 software.

The thickness of the microporous polymer separator layer is preferably greater than 0.025 mm and less than or equal to 0.6 mm. Preferably, the thickness of the microporous polymer separator layer is within the range of 0.050 to 0.25 mm and, in some instances, in the range of 0.1 mm to 0.2 mm.

In various embodiments herein, the improved battery string employing a separator according to this disclosure provides improved voltage uniformity for at least 150 cycles, in some embodiments, at least 200 cycles, in some embodiments, at least 300 cycles, in other embodiments, at least 350 cycles, and in various embodiments, for more than 400 cycles, in certain embodiments, for more than 450 cycles, or more than 500 cycles, or more than 550 cycles, or even more than 600 cycles. In some cases, the battery strings described herein have a cycle life that is greater than 500 cycles, in some cases, greater than 550 cycles, in some cases, greater than 600 cycles, in other cases, greater than 650 cycles, in some instances, greater than 650 cycles, in other cases, greater than 700 cycles, and in some cases, greater than 750 cycles.

The overall performance of the battery string embodied herein is improved such that the string of batteries lasts longer and the voltage differential between the monoblock batteries making up the string of batteries is lower, compared with known strings of batteries, such as known strings of known VRLA AGM batteries using only one or more conventional AGM layer(s) as the battery separator. Various battery strings described herein are strings of deep cycling batteries or deep discharge batteries, for example, a string of deep cycle or deep discharge batteries useful in an electric bike (often called e-bike). Other batteries include those used in various e-vehicles, golf carts (or golf cars), floor scrubbers, RV applications, transportation applications, and various utility and mobility devices (such as wheelchairs), e-cars, fork trucks, pallet jacks, scissor lifts, batteries useful in solar applications, batteries useful in uninterrupted power supply (UPS) battery strings, and the like. Some such deep cycling strings of batteries include batteries whose depth of discharge is greater than 50% of the battery's energy, in some embodiments, greater than 60%, in other embodiments, greater than 70%, and in other embodiments, greater than 80%. Other strings of batteries are contemplated herein including certain shallow discharge batteries, which are also useful in high energy or very high energy applications where battery life and voltage uniformity are also important.

In addition, the improved battery strings described herein are useful for preventing premature failure of the overall battery string due to failure of one cell or one monoblock. The improved battery strings described herein may provide increased voltage uniformity to a system, for example, a system of deep cycle monoblock batteries, that may be innately sensitive to variations in voltage (when compared, for example, to batteries on constant float and/or batteries that are only lightly cycled). Additionally, the improved battery strings disclosed herein may be useful in battery systems where deep cycle abuse is taking place, and/or in environments that are very hot, and/or environments where a lack of maintenance is occurring (because it can be difficult to ensure that batteries are being properly maintained, and users even move from flooded lead acid batteries to the sometimes-more-expensive VRLA AGM batteries to reduce the amount of maintenance required, such as watering maintenance).

Various benefits may be taking place for the separators described herein to greatly improve the performance of the battery strings described herein. By way of example, the separators may provide the monoblock batteries in the battery strings with reduced numbers of shorts or microshorts, acid displacement may be minimized, grid corrosion may be minimized, and uniform compression in the batteries may be taking place. The improved battery strings herein exhibit enhanced string uniformity over the course of the life of the string, reduced failure rates, minimum capacity loss (minimum harm to run time), and longer cycle lives.

In various embodiments herein, a battery string is torn down after a high number of cycles, for example, an abusive number of cycles, and surprisingly, the battery separators in the battery string are determined to be in good condition even after the high number of cycles. By way of example only, tear down of a 48 volt battery string useful in an electric bicycle (e-bike) after 755 cycles using a separator according to various embodiments described herein revealed battery separator still in good condition as opposed to the same type of battery string using a conventional AGM separator after 535 cycles, in which the battery separator was not in good condition. In addition, tear down of a 48 volt battery string useful in an electric bicycle (e-bike) after 494 cycles using a separator according to various embodiments described herein revealed a grid that was corroded and/or used up after 181 more cycles compared with a control battery string using a conventional AGM separator, where the grid was used up after 313 cycles. Such deep cycling testing reveals that cycle life improvement for battery strings described herein may be, in some embodiments, greater than 30% improvement in cycle life (or pack life or string life), in other embodiments, greater than 35% improvement, in other embodiments, greater than 40% improvement, in some embodiments, greater than 45% improvement, and in still other embodiments, greater than 50% improvement, and so forth.

In short, the improved battery strings described herein reveal improved uniformity with overall improvement in the string, as the monoblock batteries in the string are working better together. Battery performance and life is increased for each monoblock and ultimately for the string of batteries.

The microporous polyolefin separator layer used in various embodiments herein may be provided with one or more additives. One such additive that may be present in the polyolefin is a surfactant. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfosuccinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated fatty alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive can be represented by a compound of Formula (I)

in which
R is a non-aromatic hydrocarbon radical with 10 to 4200 carbon atoms, preferably 13 to 4200, which can be interrupted by oxygen atoms,
$R^1$ is H, $-(CH_2)_k COOM^{x+}{}_{1/x}$ or $-(CH_2)_k-SO_3M^{x+}{}_{1/x}$, preferably H, where k is 1 or 2,
M is an alkali metal or alkaline-earth metal ion, $H^+$ or $NH_4^+$, where not all the variables M simultaneously have the meaning $H^+$,
n is 0 or 1,
m is 0 or an integer from 10 to 1400 and
x is 1 or 2,
the ratio of oxygen atoms to carbon atoms in the compound according to Formula (I) being in the range from 1:1.5 to 1:30 and m and n not being able to simultaneously be 0. However, preferably only one of the variables n and m is different from 0.

By non-aromatic hydrocarbon radicals is meant radicals which contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

The use of the compounds of Formula (I) for the production of an additive for various battery separators described herein may also provide such separators with effective protection against oxidative destruction. In some embodiments, battery separators are preferred which include an additive containing a compound according to Formula (I) in which
R is a hydrocarbon radical with 10 to 180, preferably 12 to 75 and quite particularly preferably 14 to 40 carbon atoms, which can be interrupted by 1 to 60, preferably 1 to 20 and quite particularly preferably 1 to 8 oxygen atoms, particularly preferably a hydrocarbon radical of formula $R^2$—[$(OC_2H_4)_p(OC_3H_6)_q$]—, in which $R^2$ is an alkyl radical with 10 to 30 carbon atoms, preferably 12 to 25, particularly preferably 14 to 20 carbon atoms, P is an integer from 0 to 30, preferably 0 to 10, particularly preferably 0 to 4 and q is an integer from 0 to 30, preferably 0 to 10, particularly preferably 0 to 4, compounds being particularly preferred in which the sum of p and q is 0 to 10, in particular 0 to 4, n is 1 and m is 0.

Formula $R^2$—[$(OC_2H_4)_p(OC_3H_6)_q$]— is to be understood as also including those compounds in which the sequence of the groups in square brackets differs from that shown. For example according to the invention compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)CH_2$ and/or $OCH_2CH(CH_3)$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficultly, soluble in water and sulphuric acid have proved to be particularly advantageous. Also preferred are additives which contain a compound according to Formula (I), in which R is an alkane radical with 20 to 4200, preferably 50 to 750 and quite particularly preferably 80 to 225 carbon atoms, M is an alkali metal or alkaline-earth metal ion, $H^+$ or $NH_4^+$, in particular an alkali metal ion such as $Li^+$, $Na^+$ and $K^+$ or $H^+$, where not all the variables M simultaneously have the meaning $H^+$, n is 0, m is an integer from 10 to 1400 and x is 1 or 2.

As suitable additives there may be mentioned here in particular polyacrylic acids, polymethacrylic acids and acrylic acid-methacrylic acid copolymers, whose acid groups are at least partly, i.e. preferably 40%, particularly preferably 80%, neutralized. The percentage refers to the number of acid groups. Quite particularly preferred are poly(meth)acrylic acids which are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass $M_w$ of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers which, besides (meth)acrylic acid contain ethylene, maleic acid, methyl acrylate, ethyl acrylate, butyl acrylate and/or ethylhexyl acrylate as comonomer. Copolymers are preferred which contain at least 40 wt.-%, preferably at least 80 wt.-% (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

The microporous polyolefin separator layer can be provided in various ways with the additive or additives. The additives can for example be applied to the polyolefin layer when it is finished (i.e., after the extraction) or added to the mixture used to produce the polyolefin layer. According to a preferred embodiment the additive or a solution of the additive is applied to the surface of the microporous polyolefin separator layer. This variant is suitable in particular for the application of non-thermostable additives and additives which are soluble in the solvent used for the extraction step in making porous or microporous the microporous polyolefin separator layer. Particularly suitable as solvents for the additives according to the invention are low-molecular-weight alcohols, such as methanol and ethanol, as well as mixtures of these alcohols with water. The application can take place on the side facing the negative electrode, the side facing the positive electrode or on both sides of the separator.

The additive can be present at a density of at least 0.5 g/m², 1.0 g/m², 1.5 g/m², 2.0 g/m², 2.5 g/m², 3.0 g/m², 3.5 g/m², 4.0 g/m², 4.5 g/m², 5.0 g/m², 5.5 g/m², 6.0 g/m², 6.5 g/m², 7.0 g/m², 7.5 g/m², 8.0 g/m², 8.5 g/m², 9.0 g/m², 9.5 g/m² or 10.0 g/m². The additive can be present on the separator at a density between 0.5-10 g/m², 1.0-10.0 g/m², 1.5-10.0 g/m², 2.0-10.0 g/m², 2.5-10.0 g/m², 3.0-10.0 g/m², 3.5-10.0 g/m², 4.0-10.0 g/m², 4.5-10.0 g/m², 5.0-10.0 g/m², 5.5-10.0 g/m², 6.0-10.0 g/m², 6.5-10.0 g/m², 7.0-10.0 g/m², 7.5-10.0 g/m², 5.0-10.5 g/m², 5.0-11.0 g/m², 5.0-12.0 g/m², or 5.0-15.0 g/m².

The application also may take place by dipping the polyolefin layer in the additive or a solution of the additive and subsequently optionally removing the solvent, e.g., by drying. In this way the application of the additive can be combined, for example, with the extraction often applied during production of the microporous polyolefin separator layer.

In certain embodiments of the invention, the microporous polyolefin separator layer (either having a performance enhancing additive or not) comprises a plurality of acid filling channels or a network of acid filling channels. These acid filling channels are imparted to this microporous polyolefin layer by adding ribs to the layer and/or embossing the layer. When ribs are added to the microporous polyolefin separator layer, such ribs may be added to one side or to both sides of the polyolefin layer. In some embodiments where ribs are added to both sides, one side may include negative cross-ribs. In some embodiments, the negative cross-ribs may be at an angle relative to the machine direction or transverse direction of the layer. In various embodiments, a pattern of ribs may be added to the layer, and such a pattern may include embattlements, serrations, interrupted ribs, and/or the like. The various patterns of ribs and/or embossed regions (sometimes potentially called calendered regions) include patterns that allow battery acid into the separator, quickly, while simultaneously allowing air to escape out of the separator. In some preferred embodiments, the acid filling channels (or air flow channels) allow air flow while at the same time the ribs or embossments forming the acid filling channels are not so large as to interfere with the separator's overall contact with the electrodes.

After acid filling channels are created on certain microporous polyolefin separator layer(s) useful in various embodiments described herein, such a microporous polyolefin separator layer is joined with one or more AGM layers to form the preferred composite or multi-layer separator disclosed herein. Various methods contemplated herein involve providing a VRLA battery system including an anode and a cathode and placing a composite separator as described herein between the anode and the cathode under compression, and filling the battery system with acid, where the acid filling time is reduced, and preferably, is significantly reduced compared with the acid filling time for VRLA batteries employing traditional battery separators. For example, the acid filling time may be reduced by 3 times, or in some embodiments, by 6 times, or in some embodiments, by 10 times, or more when compared to the acid filling time for a previously known VRLA battery or a previously known VRLA AGM battery. The improved separators, batteries, methods, and systems described herein may also influence gas recombination in the battery system.

In certain embodiments herein, an improved multi-layer battery separator for a VRLA battery is formed comprising one or more AGM layers and a porous polyethylene layer that comprises vertical acid filling channels, which channels provide the separator with areas of lower compression and areas of higher compression, relative to the electrodes in the battery, and which acid filling channels facilitate more rapid acid transport compared to acid transport obtained using conventional separators. During filling of the battery with acid, the separators described herein enhance the diffusion of the acid toward the interior region of the electrodes. The non-uniform compression that is imparted to one or both sides of the battery separator described herein leads to increased acid filling speeds while retaining an AGM layer as an acid reservoir against the positive plate, the negative plate, or both.

The separators, batteries, battery strings, methods, battery systems, and vehicles described herein may provide improved resiliency for the separator and system with less likelihood of breaking down over time, which resiliency may be important for intimate contact with the battery electrodes and which resistance to degradation or breaking down of the micro glass fibers may be important for battery performance and life. This is especially important for battery strings, wherein the failure of a single battery along the string can result in reduced performance and early failure of the complete string.

In various embodiments, the microporous polyolefin separator layer comprises polyethylene. In some embodiments, the polyethylene is high molecular weight polyethylene. In various embodiments, the high molecular weight polyethylene is ultra-high molecular weight polyethylene (and may contain various fillers, plasticizers, agents, additives, and/or the like). In various embodiments, the microporous polyolefin separator layer is ribbed and/or embossed. The preferred ribs may be 0.008 mm to 1 mm tall and may be spaced 0.001 mm to 10 mm apart, while the preferred backweb thickness of the microporous polyolefin separator layer without ribs or embossments may be about 0.05 mm to about 0.25 mm. In some embodiments, the ribs may be in a pattern such as they may be on one side of the separator layer or on both sides of the polyolefin separator, from 0 to 90 degrees in relation to each other. Various patterns including ribs on both sides of the separator layer may include negative cross-ribs on the second side or back of the separator. In other embodiments, the ribs may be in a pattern such that vertically positioned ribs are spaced 0.5 mm apart with an opposing smooth or flat back side.

Another pattern of ribs may include wider spacing, e.g., 6 mm apart, where such ribs are taller and the separator layer has an opposing smooth or flat back side. Such a pattern includes ribs that are more widely spaced apart than various patterns already mentioned and thus there are fewer acid filling channels imparted to the improved separator.

Similarly, the embossments may have various configurations, such as, by way of example, a textured embossing pattern where, when viewed under a microscope, such as a 3-D microscope, dark spots signify areas with smaller pores or a compressed pore structure and where cross-section views, images or micrographs show the acid filling channels created by the textured embossing.

What the texturing (through the addition of ribs and/or embossed regions) of the separator may lead to is a bi-modal pore size of the separator system (AGM+ textured microporous polyolefin separator layer, such as a PE layer) while under compression >10 kpa (a pressure typically found in a VRLA battery). The smaller pores may provide the improved separator or system with dendrite and/or short protection (e.g., possibly because of high tortuosity, etc.), may facilitate acid absorption, and/or may allow for high capillary action to hold or retain acid, retarding acid stratification, while the larger pores may provide the improved separator or system with gas transfer (e.g., efficient oxygen transfer) through the membrane or separator and/or may create larger pathways for acid displacement, as these pores are under less pressure than the smaller pores. In various embodiments, the acid retention obtained by the capillary action from larger pores to smaller pores may retard dry spots in the separator and/or may hinder thermal runaway of a battery system using such a separator. Improving the cycling of VRLA batteries using the improved separators, methods and systems described herein may result from the improved transference of oxygen within the improved separator between the electrodes to avoid dry out, etc.

In various embodiments, the bi-modal pore size distribution of the textured microporous polyolefin separator layer may include regions of larger pores and regions of smaller pores. Various combinations of pore sizes can be created with possibly preferred pore sizes between about 0.01 micron and 6 microns, such that various bi-modal pore size distributions may be created. By way of example only, a region of larger pores might include pores that are 1-6 microns in size, while pores in the region(s) of smaller pores might be sub-micron in size. The pore size will depend on the initial pore size distribution in the separator layer before various ribs and/or embossments are added thereto.

The separator formed in various embodiments herein is compressible especially when combined with one or more AGM layers and placed under compression between the electrodes of a VRLA-AGM battery. This resiliency of the improved separator described herein may be important, for example, in deep cycling of the battery system. In various embodiments, the separator is 25% compressible. In other embodiments, the separator is about 10% to about 40% compressible at a pressure greater than 10 kpa.

The separator described herein may be resilient as well as compressible. The increased levels of compressibility and resiliency of the improved separator may mean that the thickness variation from the embossing and/or the addition of ribs to certain improved separator layers described herein leads to desirable spring back (e.g., spring back of the improved separator over the life of the battery, as AGM fibers break down) and continued high compression of the positive active material (PAM) on the positive electrode over time. The positive electrode in a lead acid battery is not static but grows and shrinks in size during deep cycling. The grid movement loosens the PAM over time as well as breaking the AGM fibers. Enhanced resiliency or spring back of an improved or inventive separator may mean that compression and intimate plate contact is maintained over time, thereby resulting in improved battery performance, less PAM shedding and migration though the separator creating shorts (for example, in deep cycle applications of a battery), and thus improvement in a battery's overall cycle life. Thus, the battery systems described herein using certain improved battery separators described herein exhibit improved compression.

In various VRLA battery systems described herein, the acid filling time is significantly decreased compared with battery systems using other known or conventional separators. This may be important, for example, because at times, a higher acid filling time can lead to poorer overall quality for the battery system because while filling, acid may turn to water and solubilize some of the lead in the system, creating lead sulfate and leading to hydration shorts. Thus, for the present separators, methods and systems, the lower acid filling times lead to higher overall quality of the electrodes, battery system, battery string, and lower cost of production with fewer rejects.

In many of the improved separator, battery, battery string, method, system, and vehicle embodiments described above, the acid filling channels, produced by ribs and/or embossed regions in certain polyethylene separator layers, are made of stable materials such that they remain part of the separator throughout the life of the battery. In some embodiments, rather than spring back, the embossments and/or ribs may collapse over time, which may be desirable as intimate contact between the electrodes may be maintained. In such situations, the embossments and/or ribs create acid filling channels or air flow channels that greatly increase the speed of acid-filling a battery (for example, a starting battery) comprising the improved separator of certain embodiments; and such a purpose (e.g., increased acid-filling speed) has already been fulfilled before the ribs and/or embossments collapse. Additionally, in various embodiments, the ribs and/or embossments embed into the negative active material (NAM) after formation and during battery cycling.

In other embodiments herein, the acid filling channels on the microporous polyolefin separator layer actually dissolve after acid filling is complete in the battery system, leading to improved contact between the electrodes and the separator and improved compression while at the same time facilitating the significantly improved acid filling process (e.g., lowering the time for acid filling) for the battery system compared with systems using conventional separators. In such embodiments, the filling channel may be made of some polymer, starch or starch derivative, and may dissolve into $CO_2$ or some other inert gas after contact with acid during acid filling. In such embodiments, the battery system is provided with maximum acid availability after the acid filling process is complete. In some similar embodiments, the rib, embossed region, and/or filling channel may comprise fumed silica and/or a binder which may dissolve into the AGM separator after the battery is filled with acid. In other similar embodiments, fumed silica is added to the electrolyte system, which fumed silica swells, thereby closing or reducing the size of the filling channels after acid filling.

In some embodiments, the microporous polyolefin separator layer may include a coating on one or both sides of such layer. Such a coating may include a surfactant or other material. In some embodiments, the coating may include one or more materials described, for example, in U.S. Patent Publication No. 2012/0094183, which is incorporated by reference herein. Such a coating may, for example, reduce the overcharge voltage of the battery system, thereby extending battery life with less grid corrosion and preventing dry out and/or water loss. Also, if the separator layer is equipped with ribs, and the ribs are placed against a plate or electrode, the ribs may be coated with a conductive material to further enhance battery performance, plate life, and/or the like. Additional functionalized coating(s) may be added to the microporous polyolefin separator layer and/or to the layer(s) of AGM material.

A battery producer's productivity is greatly increased by the improved separators, batteries, methods, battery strings, and systems described herein, as acid filling time has been significantly decreased, leading to reduced manufacturing time and cost associated therewith.

Various battery strings and applications may benefit from the improved separators, methods, batteries, battery strings, systems, and vehicles described herein. By way of example only, such may be used in VRLA AGM batteries in e-bikes, motive power batteries, e-car batteries, golf car batteries, and so forth. Various electric vehicles whose battery strings may greatly benefit from the separators, batteries, and improved strings of batteries disclosed herein include, but are not limited to, e-bike battery strings, fork truck battery strings, pallet jack battery strings, golf car battery strings, scissor lift battery strings; such vehicles perform better with improved uniformity in their VRLA battery strings, such as deep cycling battery strings. Additionally, battery strings used in uninterrupted power supply (UPS) applications and solar applications may also benefit from the inventions disclosed herein.

EXAMPLES

Example 1

For this example, a 48 volt total voltage battery string of four 12-volt monoblock VRLA batteries attached in series was tested using a separator according to various embodiments described herein. These battery strings were 12 amp-hour electric bicycle (or e-bike) batteries. Surprisingly, it was found that the life of the battery string using the separator described herein was extended more than 30%. Additionally, surprisingly, it was found that there was significantly increased uniformity between the batteries in the string formed in accordance with the present disclosure. The inventive battery string included, in each monoblock VRLA battery, a battery separator that included (a) a flat layer of polyethylene separator material, which layer was about 170-175 microns thick (and had a puncture strength of about 8.9 N and had a porosity of about 60% and had a basis weight of about 110 gsm) and which contained an additive that was a surfactant; sandwiched between (b) and (c), two layers of AGM material, each of which layer was about 0.9-1.0 mm thick and included glass fibers. Additional properties of the layer of polyethylene separator material can be found in the chart of FIG. 4. Conversely, the conventional battery string included, in each monoblock VRLA battery, a battery separator that included a commercial grade AGM layer that was about 1.0-1.3 mm thick and included glass fibers.

The e-bike battery strings tested in this example were life tested to 100% depth of discharge (DOD). The battery string containing the control AGM separator had a cycle life that ended at about 540 cycles, whereas the battery string containing the battery separator described above and in accordance with the present disclosure had a cycle life that lasted up to about 770 cycles (See FIG. 1). The results in FIG. 1 also show that the voltage uniformity for the battery string according to the present disclosure was much higher. For example, FIG. 1 reveals the much lower value for voltage differential of about 0.5 $V_{diff}$ up to about 375-400 cycles for the battery string formed according to various embodiments presented herein, versus the much higher value for voltage differential of about 2.5 $V_{diff}$ up to about 375-400 cycles for the battery string formed according to conventional methods. The voltage differential for the battery string according to the present invention was five times less than the voltage differential for the conventional battery string. Thus, the four monoblock batteries working together in this particular battery string were working five times more uniformly together than the batteries in the conventional battery string using simply an AGM battery separator.

Example 2

For this example, another set of 48 volt total voltage battery strings comprising four 12-volt monoblock VRLA batteries attached in series was tested. These battery strings were 12 amp-hour electric bicycle (or e-bike) batteries. Surprisingly, it was found that the cycle life of the battery string made according to the present disclosure was extended significantly.

The inventive battery string included, in each monoblock VRLA battery, a battery separator that included (a) a flat layer of polyethylene separator material, which layer was about 170-175 microns thick and which contained an additive that was a surfactant; sandwiched between (b) and (c), two layers of AGM material, each of which layer was about 0.9-1.0 mm thick and included glass fibers. Conversely, the conventional battery string included, in each monoblock VRLA battery, a battery separator that included a commercial grade AGM layer that was about 1.0-1.3 mm thick and included glass fibers.

Figure 2:
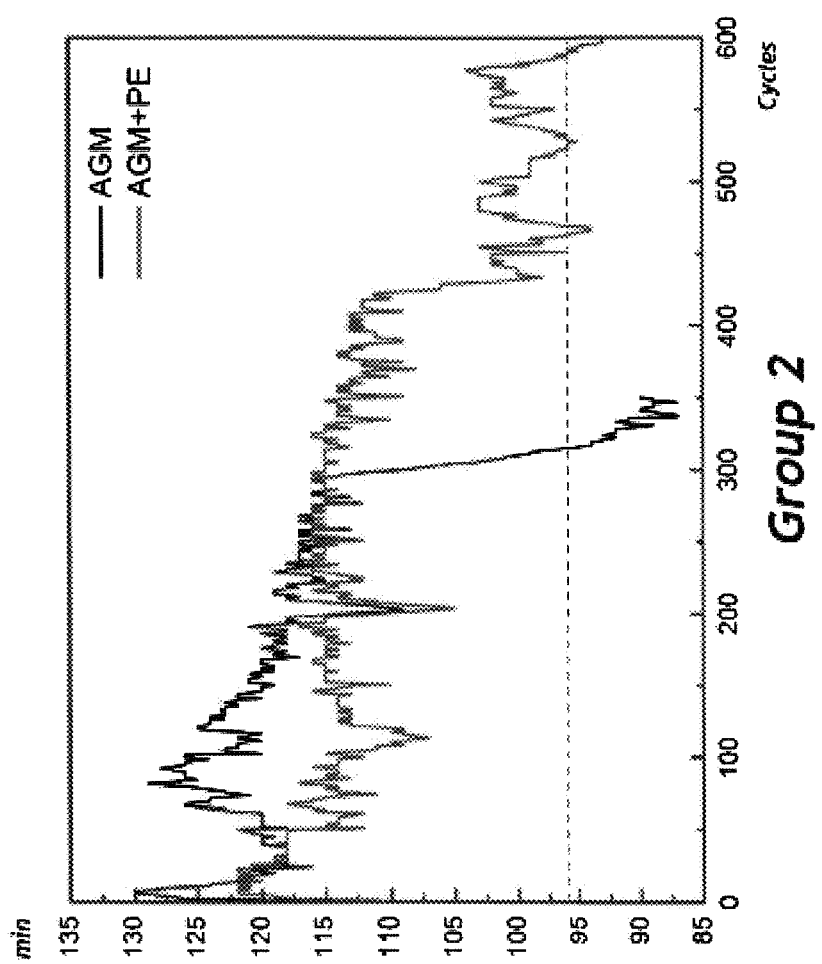
FIG. 2 includes a comparison of an improved VRLA AGM battery string made according to embodiments described herein with a conventional VRLA AGM battery string.

The e-bike battery strings tested in this example were cycle life tested to 100% depth of discharge (DOD). The battery string containing the control AGM separator had a cycle life that ended at about 350 cycles, whereas the inventive battery string containing the battery separator described above and in accordance with various embodiments disclosed herein had a cycle life that lasted up to at least about 600 cycles (See FIG. 2).

Example 3

For this example, yet another set of 48 volt total voltage battery strings, each containing four 12-volt monoblock VRLA batteries attached in series, was tested. These battery strings were 12 amp-hour electric bicycle (or e-bike) batteries. Surprisingly, it was found that there was significantly increased uniformity between the batteries in the string formed in accordance with the present disclosure. The inventive battery string included, in each monoblock VRLA battery, a battery separator that included (a) a flat layer of polyethylene separator material, which layer was about 170-175 microns thick (and had a puncture strength of about 8.9 N and had a porosity of about 60% and had a basis weight of about 110 gsm) and which contained an additive that was a surfactant; sandwiched between (b) and (c), two layers of AGM material, each of which layer was about 0.9-1.0 mm thick and included glass fibers. Conversely, the conventional battery string included, in each monoblock VRLA battery, a battery separator that included a commercial grade AGM layer that was about 1.0-1.3 mm thick and included glass fibers.

Figure 3:
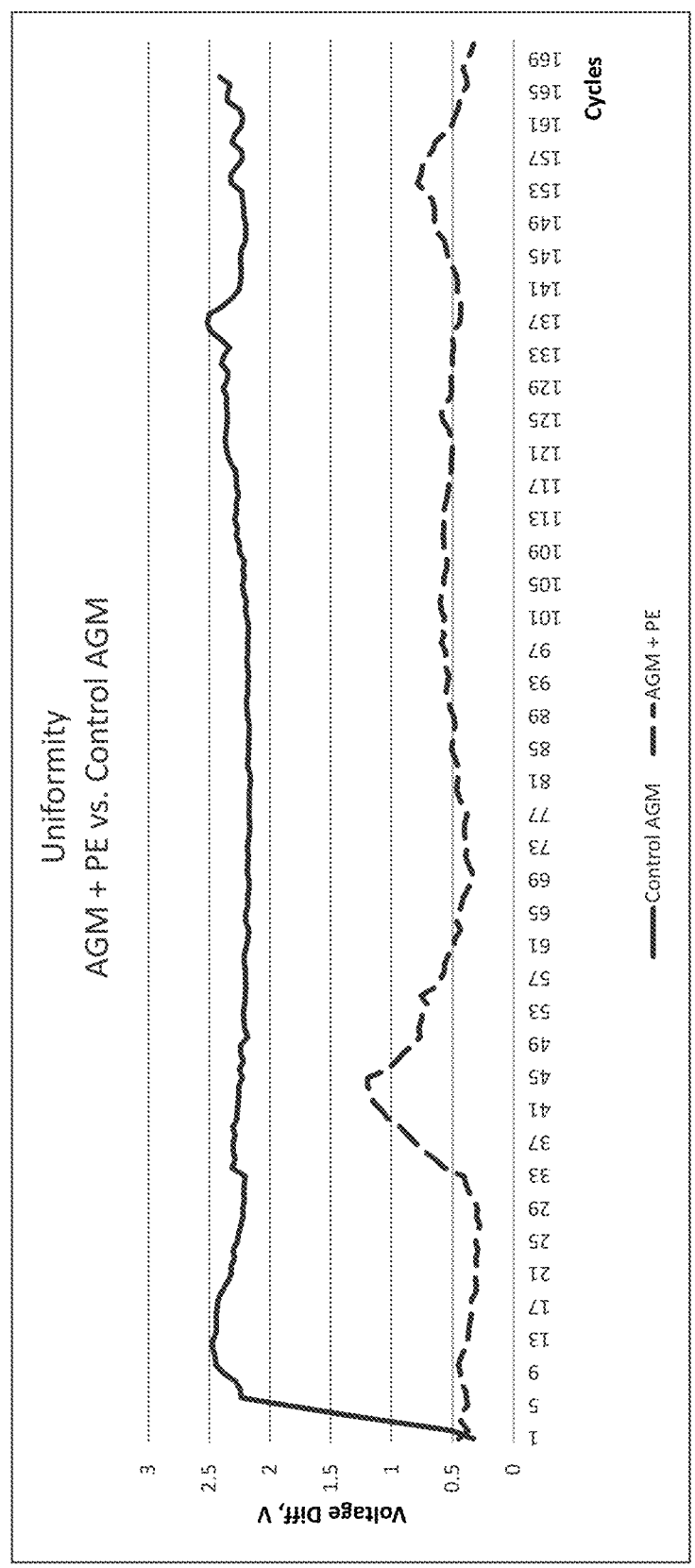
FIG. 3 includes a comparison of an improved VRLA AGM battery string made according to embodiments described herein with a conventional VRLA AGM battery string.

The e-bike battery strings were tested in this example for voltage uniformity. The results in FIG. 3 show that the voltage uniformity for the battery string according to the present disclosure was much higher. For example, FIG. 3 reveals the much lower value for voltage differential ($V_{diff}$) of close to about 0.5 $V_{diff}$ throughout the entire about 169 cycles, for the battery string formed according to various embodiments presented herein, versus the much higher value for voltage differential of about 2.5 $V_{diff}$ throughout the entire about 169 cycles, for the battery string formed according to conventional methods. The voltage differential for the battery string according to the present invention was about five times less than the voltage differential for the conventional battery string. Thus, the four monoblock batteries working together in this particular battery string were working about five times more uniformly together than the batteries in the conventional battery string using simply an AGM battery separator.

Example 4

In this Example, battery strings were formed that were 12 amp-hour batteries, for use in e-bikes (48-volt string with four batteries hooked together in series to make the battery string). The battery strings made in accordance with the present invention comprised seven positive plates and eight negative plates and further included a separator sandwich assembly that included a 0.55 mm thick AGM layer comprising glass fibers next to each positive plate, a microporous polyethylene separator layer that was about 0.175 mm thick, and a 0.43 mm thick AGM layer comprising glass fibers next to each negative plate, all of which was under a compression of about 75-85 kpa. The control batteries included the same battery plates but, as the battery separator, contained only two AGM layers, each of which layer was 0.55 mm thick and comprised glass fibers. The charging regime used to perform the 100% depth of discharge life cycle testing for the 12 amp-hour batteries was a relatively fast charging regime to complete the cycle life testing more quickly, and the discharge was with a current of 6 amps to 10.5V/battery, whereas the charge was with 14.8 V/battery, 10 A limited, for three hours. This charge/discharge regime was repeated.

Figure 5:
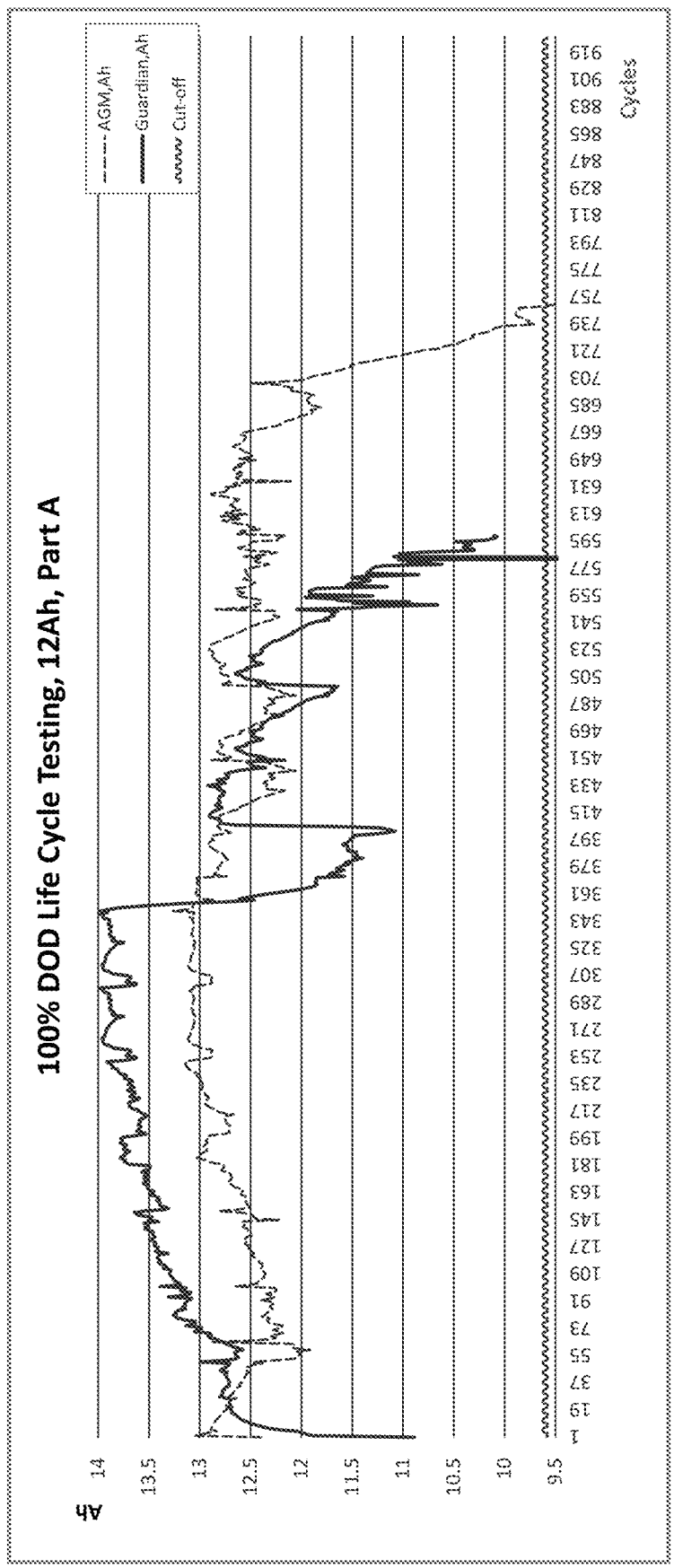
FIG. 5 includes a comparison of improved VRLA AGM battery strings made according to embodiments described herein with conventional VRLA AGM battery strings.
Figure 6:
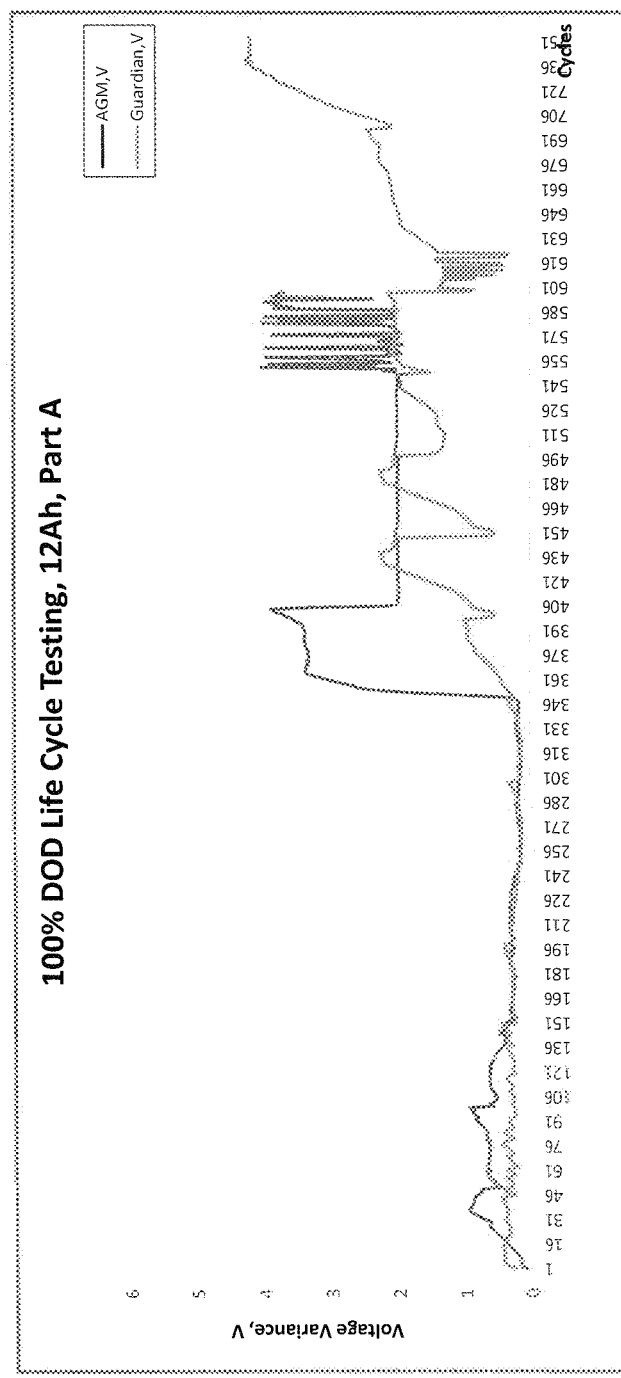
FIG. 6 includes a comparison of improved VRLA AGM battery strings made according to embodiments described herein with conventional VRLA AGM battery strings.

The results reported in FIG. 5 showed improved capacity over the life of the battery strings and a cycle life increase of about 25% (past 700 cycles) for the battery strings according to the present invention, compared with the conventional battery strings that used only AGM layers as the battery separator. The extended cycle life may, without wishing to be bound by theory, be because of preventing shorts and/or micro-shorts and/or preventing grid corrosion. And the results reported in FIG. 6 show relatively good voltage uniformity up to a high number of cycles for the battery strings according to the present invention, compared with the conventional battery strings that used only AGM layers as the battery separator.

Example 5

In this Example, battery strings were formed that were 12 amp-hour batteries, for use in e-bikes. The battery strings made in accordance with the present invention comprised seven positive plates and eight negative plates and further included a separator sandwich assembly that included a 0.5-0.55 mm thick AGM layer next to each positive plate, a microporous polyethylene separator layer that was about 0.175 mm thick, and a 0.5-0.55 mm thick AGM layer next to each negative plate, all of which was under a compression of about 70-85 kpa. The control batteries included the same battery plates but, as the battery separator, contained only two AGM layers, each of which layer was 0.58 mm thick. The charging regime used to perform the 100% depth of discharge life cycle testing for the 12 amp-hour batteries simulated an e-bike charger, which may be considered relatively slow. The discharge was with a current of 6 amps to 10.5V/battery, then the charge was with 1.8 A and 14.7 V/battery to 0.35 A, then stand for ten minutes, then charge with 1 A and 13.8 V/battery for four hours, then stand for one hour. This charge/discharge regime was repeated.

Figure 7:
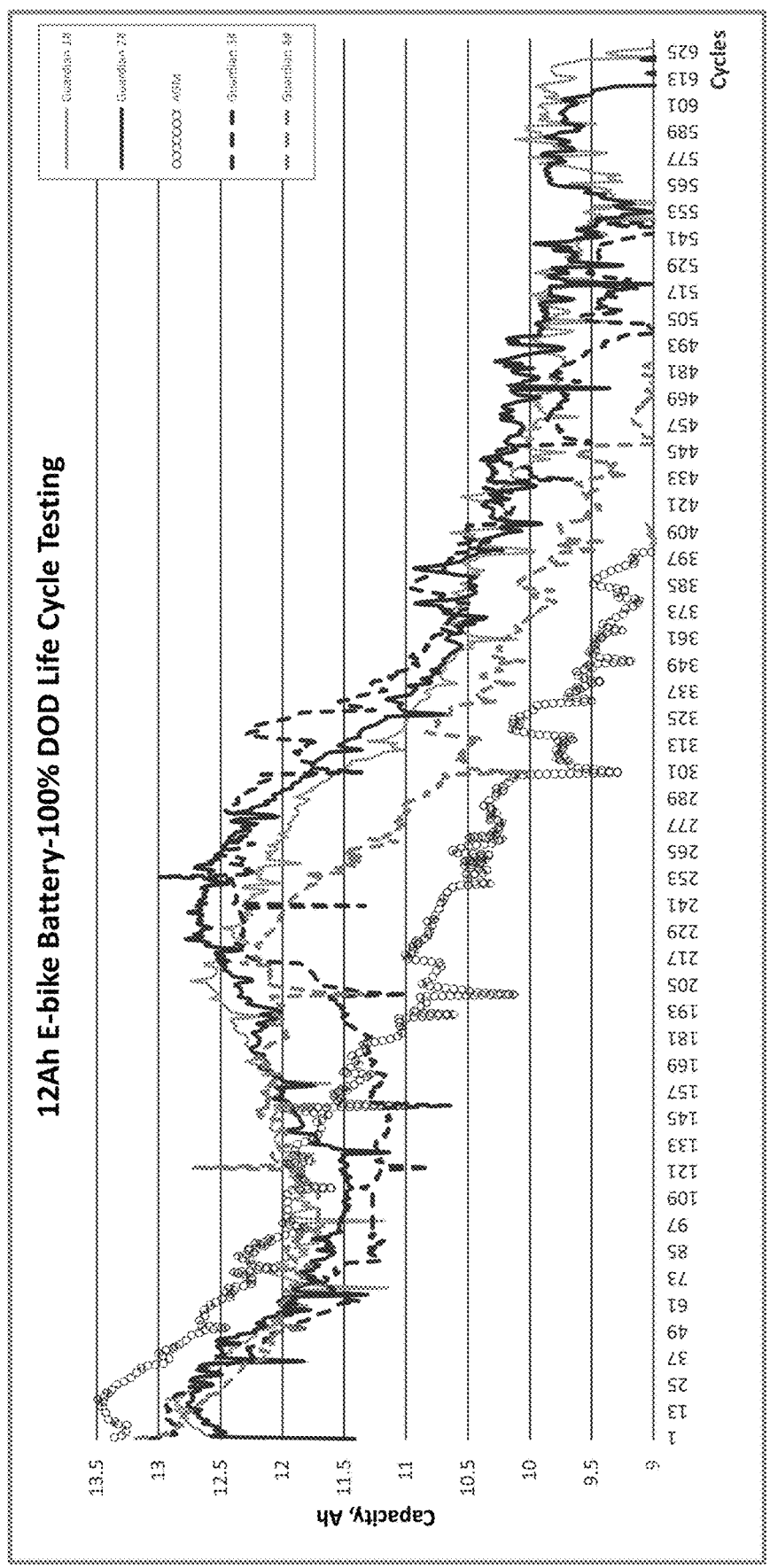
FIG. 7 includes comparisons of improved VRLA AGM battery strings made according to embodiments described herein with conventional VRLA AGM battery strings.
Figure 8:
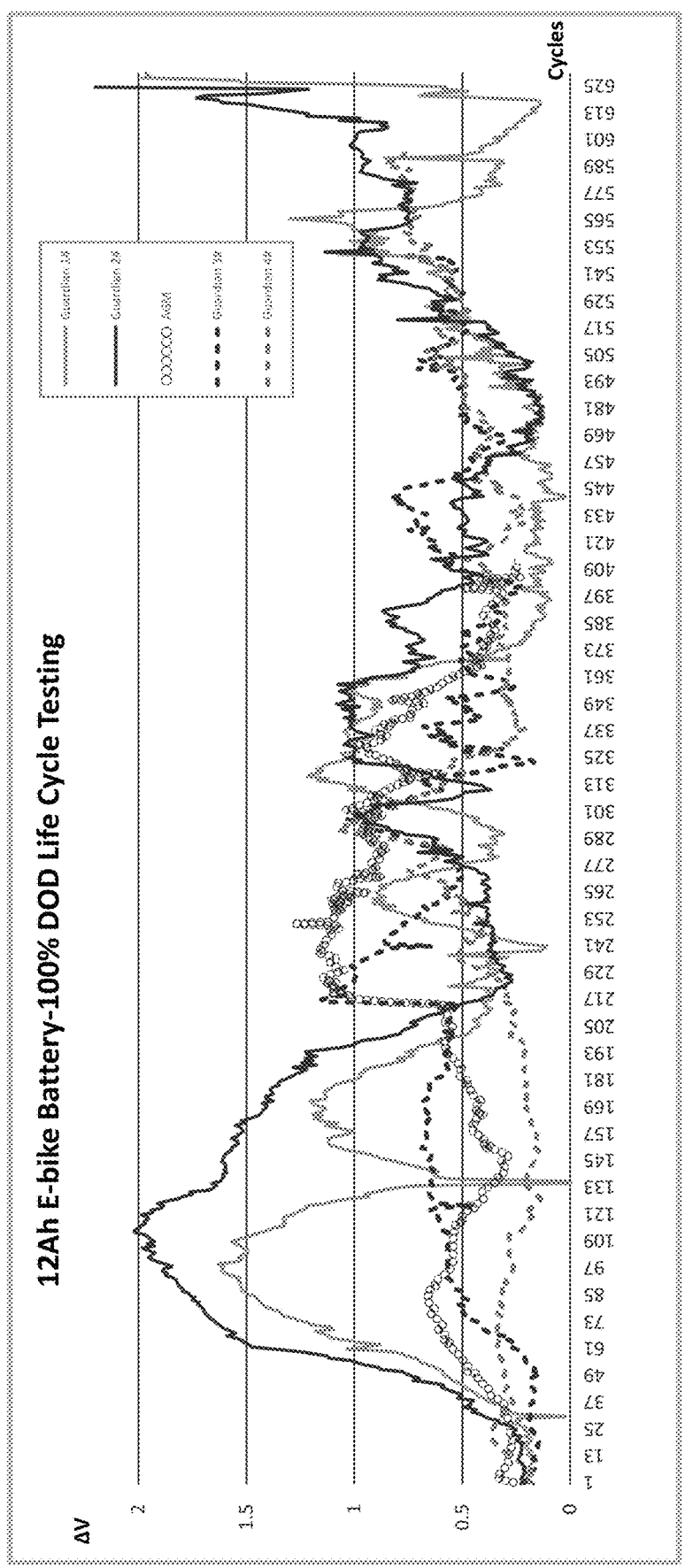
FIG. 8 includes comparisons of improved VRLA AGM battery strings made according to embodiments described herein with conventional VRLA AGM battery strings.

The results reported in FIG. 7 showed a cycle life increase of about 30% (past 600 cycles) for the battery strings according to the present invention, compared with the conventional battery strings that used only AGM layers as the battery separator. And the results reported in FIG. 8 show relatively good voltage uniformity up to a high number of cycles for the battery strings according to the present invention (especially the battery strings marked numbers 3 and 4), compared with the conventional battery strings that used only AGM layers as the battery separator.

Example 6

In this Example, battery strings are produced to make 20 amp-hour battery packs and/or strings (often 60-volt batteries, some of which may be useful in e-cars or e-vehicles), and desirable voltage uniformity and desirable cycle life extension are exhibited for battery strings according to the present invention compared with conventional battery strings.

In accordance with at least selected embodiments, aspects or objects, the present disclosure or invention is directed to improved battery or cell strings, and/or methods of manufacture and/or use. In accordance with at least certain embodiments, the present disclosure or invention is directed to improved strings of VRLA batteries (including AGM batteries and/or gel batteries) or cells and/or improved methods of using a string of VRLA batteries or cells. In addition, disclosed herein is a method, system, and battery separator for enhancing battery life and improving uniformity in a battery string, especially a VRLA AGM lead acid battery string.

Improved battery separators are disclosed herein for use in various lead acid batteries, and in particular lead acid battery strings. The improved separators disclosed herein provide substantially increased battery life, substantially increased uniformity across various batteries in a battery string, and substantially reduced battery fail rate. The improved battery strings may be advantageously employed in high depth of discharge applications such as electric bicycles, golf carts (or golf cars), uninterrupted power supply (UPS) backup power battery strings, and the like.

In some embodiments herein, there is disclosed a battery string with improved voltage uniformity and cycle life comprising:
two or more monoblock VRLA batteries wired in series, wherein the total voltage of the battery string is at least 12 volts;
wherein each monoblock battery comprises an alternating sequence of positive and negative electrodes, wherein a separator is disposed between each of the electrodes, wherein the separator comprises a microporous polyolefin layer and at least one layer comprising one or more fibrous materials, and wherein the string exhibits improved voltage uniformity and cycle life when compared with a battery string comprising a conventional AGM battery separator.

In some such embodiments, the microporous polyolefin layer comprises one or more polyolefins and comprises a filler.

In some such embodiments, the microporous polyolefin layer comprises polyethylene.

In some such embodiments, the fibrous material comprises glass fibers.

In some such embodiments, the fibrous material comprises polymeric fibers.

In some such embodiments, the microporous polyolefin layer is flat.

In some such embodiments, the microporous polyolefin layer is ribbed, embossed, and/or textured.

In some such embodiments, the microporous polyolefin layer further comprises a surfactant or an additive.

In some such embodiments, the surfactant comprises a non-ionic surfactant.

In some such embodiments that include a surfactant or additive, the surfactant or additive suppresses the overcharge potential for one or more of the monoblock batteries in the battery string or decreases the amount of grid corrosion occurring for one or more of the monoblock batteries in the battery string, or both suppresses the overcharge potential for one or more of the monoblock batteries and decreases the amount of grid corrosion occurring for one or more of the monoblock batteries.

In some such embodiments, the improved cycle life includes cycle life improvement of at least 30% for the battery string when compared with a battery string comprising a conventional AGM battery separator.

In some such embodiments, the improved voltage uniformity includes voltage uniformity improvement of at least two times the voltage uniformity of a battery string comprising a conventional AGM battery separator.

In some such embodiments, each monoblock battery is a 6-volt, 8-volt, or 12-volt monoblock battery.

Some embodiments of the various inventions disclosed herein include an enhanced cycle life electric bicycle battery string comprising the battery string described in any of the preceding paragraphs.

In some such embodiments, the invention includes an electric bicycle comprising the enhanced cycle life electric bicycle battery string described in the preceding paragraph.

In some embodiments, there is disclosed an electric vehicle battery string comprising the battery string described in any of the preceding paragraphs, wherein the electric vehicle is selected from the group consisting of: an e-bike, a motive power vehicle, an e-car, a golf car, a fork truck, a pallet jack, and a scissor lift.

In some embodiments, there is disclosed a deep cycling uninterrupted power supply (UPS) backup power battery string comprising the battery string described in any of the preceding paragraphs.

Some embodiments herein disclose a method of improving a battery string comprising the steps of:
providing a battery string comprising two or more monoblock VRLA batteries wired in series, wherein the total voltage of the battery string is at least 12 volts;

providing each monoblock VRLA battery with an alternating sequence of positive and negative electrodes;

providing a separator between each of the electrodes, wherein the separator comprises a microporous polyolefin layer and at least one layer comprising one or more fibrous materials; and cycling the battery string through charge and discharge cycles, wherein the string exhibits improved voltage uniformity during cycling and improved cycle life when compared with a known battery string comprising a conventional AGM battery separator.

And various embodiments described herein include novel or improved battery or cell strings, and/or methods of manufacture and/or use, novel or improved strings of VRLA batteries (including AGM batteries and/or gel batteries) or cells, and/or novel or improved methods of using a string of VRLA batteries, cells, and/or methods, systems, battery separators, cells, batteries, strings, and/or the like for enhancing battery life and/or improving uniformity in a battery or cell string, especially a VRLA AGM lead acid battery string, high depth of discharge applications, and/or a deep cycling battery or cell string.

In accordance with at least selected embodiments, aspects or objects, the present disclosure or invention is directed to or provides novel or improved separators, composite separators, batteries, cells, battery strings, deep discharge batteries, and/or methods of manufacture and/or use, such as separators, composite separators, batteries, cells, battery strings, deep discharge batteries, and/or methods of manufacture and/or use in or for a vehicle or power supply with at least one battery string with improved voltage uniformity and cycle life including:

two or more monoblock VRLA batteries wired in series, wherein the total voltage of the battery string is at least 12 volts;

wherein each monoblock battery comprises an alternating sequence of positive and negative electrodes, wherein a separator is disposed between each of the electrodes, wherein the separator comprises a microporous polyolefin layer and at least one layer comprising one or more fibrous materials, and wherein the string exhibits improved voltage uniformity and cycle life when compared with a battery string comprising a conventional AGM battery separator, and/or wherein the microporous polyolefin layer comprises one or more polyolefins and comprises a filler, wherein the microporous polyolefin layer comprises polyethylene, wherein the fibrous material comprises glass fibers, wherein the fibrous material comprises polymeric fibers, wherein the microporous polyolefin layer is planar or flat or ribless, wherein the microporous polyolefin layer is ribbed, embossed, and/or textured, wherein the microporous polyolefin layer further comprises a surfactant or an additive, wherein the surfactant comprises a non-ionic surfactant, wherein the surfactant or additive suppresses the overcharge potential for one or more of the monoblock batteries in the battery string or decreases the amount of grid corrosion occurring for one or more of the monoblock batteries in the battery string, wherein the improved cycle life includes cycle life improvement of at least 30% for said battery string when compared with a battery string comprising a conventional AGM battery separator, wherein the improved voltage uniformity includes voltage uniformity improvement of at least two times the voltage uniformity of a battery string comprising a conventional AGM battery separator, and/or wherein each monoblock battery is a 6-volt, 8-volt, or 12-volt monoblock battery, and/or an enhanced cycle life electric bicycle battery string, an electric bicycle comprising an enhanced cycle life electric bicycle battery string, an electric vehicle battery string comprising a battery string, and/or wherein said electric vehicle is selected from the group consisting of: an e-bike, a motive power vehicle, an e-car, a golf car, a fork truck, a pallet jack, and a scissor lift, and/or a deep cycling uninterrupted power supply (UPS) backup power battery string comprising a battery string, and/or a method of improving a battery string comprising the steps of: providing a battery string comprising two or more monoblock VRLA batteries wired in series, wherein the total voltage of the battery string is at least 12 volts;

providing each monoblock VRLA battery with an alternating sequence of positive and negative electrodes;

providing a separator between each of the electrodes, wherein the separator comprises a microporous polyolefin layer and at least one layer comprising one or more fibrous materials; and cycling the battery string through charge and discharge cycles, wherein the string exhibits improved voltage uniformity during cycling and improved cycle life when compared with a known battery string comprising a conventional AGM battery separator, and/or novel or improved battery or cell strings, and/or methods of manufacture and/or use, novel or improved strings of VRLA batteries (including AGM batteries and/or gel batteries) or cells, and/or novel or improved methods of using a string of VRLA batteries, cells, and/or methods, systems, battery separators, cells, batteries, strings, and/or the like for enhancing battery life and/or improving uniformity in a battery or cell string, especially a VRLA AGM lead acid battery string, high depth of discharge applications, and/or a deep cycling battery or cell string, and/or improved battery separators for use in various lead acid batteries, and in particular lead acid battery strings, improved separators shown or disclosed herein providing substantially increased battery life and substantially reduced battery fail rate, and/or improved battery strings advantageously employed in high depth of discharge applications such as electric bicycles, golf carts (or golf cars), uninterrupted power supply (UPS) backup power battery strings, and/or the like.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A battery string comprising:
   four or more monoblock valve regulated lead-acid (VRLA) batteries wired in series, wherein a total voltage of the battery string is 48 volts or greater;
   each VRLA monoblock battery comprises
   an alternating sequence of positive and negative electrodes, and
   a separator disposed between each of the positive and negative electrodes, the separator consists of a microporous polyolefin layer including a surfactant sandwiched between a first absorptive glass mat and a second absorptive glass mat, wherein the first absorptive glass mat has a thickness from 1.0 to 3.3 mm and the second absorptive glass mat has a thickness of 0.6 mm, wherein the microporous polyolefin layer is a polyethylene layer with a ribbed or embossed backweb, a backweb thickness of the microporous polyolefin layer not including the thickness of the ribs or embossments is from 0.05 mm to 0.25 mm, and the microporous polyolefin layer with the ribbed or embossed backweb of the separator has a bi-modal pore size distribution consisting of a first region of pores consisting of larger pores having a size of 1 to 6 microns and a second region of pores consisting of smaller pores having a size of less than 0.9 micron, wherein 90% of the pores are smaller pores.

2. A battery string consisting of:
   four or more monoblock valve regulated lead-acid (VRLA) batteries wired in series, wherein a total voltage of the battery string is 48 volts or greater;
   each VRLA monoblock battery consists of
   an alternating sequence of positive and negative electrodes, and
   a separator disposed between each of the positive and negative electrodes, the separator consists of a microporous polyolefin layer including a surfactant sandwiched between a first absorptive glass mat and a second absorptive glass mat, wherein the first absorptive glass mat has a thickness from 1.0 to 3.3 mm and the second absorptive glass mat has a thickness of 0.6 mm,
   wherein the microporous polyolefin layer is a polyethylene layer with a ribbed or embossed backweb, a backweb thickness of the microporous polyolefin layer not including the thickness of the ribs or embossments is from 0.05 mm to 0.25 mm, the microporous polyolefin layer with the ribbed or embossed backweb of the separator has a bi-modal pore size distribution consisting of a first region of pores consisting of larger pores having a size of 1 to 6 microns and a second region of pores consisting of smaller pores having a size of less than 0.9 micron, wherein 90% of the pores are smaller pores.

3. The battery string according to claim 1, wherein the first absorptive glass mat and the second absorptive glass mat each comprise polymeric fibers.

4. An electric vehicle comprising a battery comprising the battery string of claim 1.

* * * * *